July 5, 1960 W. D. HALL 2,944,168
CONTROL DEVICE FOR FANS
Filed May 31, 1957 2 Sheets-Sheet 1

INVENTOR
William D. Hall

July 5, 1960 W. D. HALL 2,944,168
CONTROL DEVICE FOR FANS
Filed May 31, 1957 2 Sheets-Sheet 2

INVENTOR
William D. Hall

United States Patent Office 2,944,168
Patented July 5, 1960

2,944,168

CONTROL DEVICE FOR FANS

William D. Hall, 904 Ring Bldg., Washington, D.C.

Filed May 31, 1957, Ser. No. 662,683

4 Claims. (Cl. 307—117)

This invention relates to control devices and more particularly to thermostatic controls for electric fans. It is now well known that a thermostatic control may be used in conjunction with ordinary domestic window fans. The thermostatic control is adjacent the fan and de-energizes the fan motor when the fan has moved enough cool air into the house to lower the temperature below the setting of the thermostat. The thermostatic controls that are now known and in use, in conjunction with electric fans, have several inherent disadvantages. Usually the temperature sensitive element is permanently mounted on the frame surrounding the fan and since this frame is often subject to vibration, the switch contacts often chatter with consequent disadvantages. For example, as a fan slows down after being turned off, it often passes through certain speeds at which the frame resonates and causes a chattering that tends to reclose the switch repeatedly. Frequently this resonant condition occurs only in some part of the frame, while other parts are not subject to vibration, this depending upon the type of frame as well as how it is mounted in the window. The character of the vibration and its extent vary so widely with different fans and their mounting in actual use that no general rules can be stated.

One object of this invention is to provide a thermostatic control for fans that will overcome the vibration problems heretofore existing.

Many persons have already purchased, and many will purchase in the future, fans without thermostats only to later realize that they would have preferred to have purchased a fan with a thermostat. This invention will enable such persons to have a thermostat, since another object of this invention is to provide a thermostatic control that can be attached to existing fans.

Another object of the invention is to provide a highly efficient thermostatic control for fans. It is also an object to improve the operation of the device as well as to reduce the possibility of electric shocks.

Still another object of the invention is to provide an improved way of attaching the thermostatic control to the fan.

It is yet another object of the invention to provide a very simple thermostatic control that can be sold separately from the fan and which is adapted to be mounted on and then control almost any domestic fan.

Other objects and advantages of the invention will appear as this description proceeds.

In carrying out the above objects, the invention employs in one non-limiting form, a casing that is provided with special clamping means that enables it to be attached to the grill of almost any electric fan. In view of the fact that the clamping means enables the casing to be clamped anywhere on the grill it is usually possible to select a location where vibration is so low that chattering of the switch contacts is avoided. This overcomes the chattering problem often encountered when the switch is mounted in a permanent relation to the fan. The casing is provided with large vents which serve three purposes (a) to allow as much air to flow through the casing as possible and thus reduce as much as possible the interference that the casing causes to free flow of air, (b) allows air circulation across the temperature sensitive element, and (c) provides a mounting hole for the aforesaid clamping means.

The temperature sensitive element is mounted in the casing and in the path of the air flowing therethrough. A suitable temperature setting control is provided to enable the thermostat to be adjusted to operate at any desired temperature. The electric switch is completely enclosed in a second casing, that is inside the first one. This insures that if a child should stick a piece of metal such as a spoon through one of the vents that the piece of metal could not come into contact with any of the parts that are impressed with electric potential.

The casing also includes a female socket into which the male plug of the electric fan may be placed. This female socket, said switch, and another male plug are connected in series, whereby the aforesaid switch controls the fan.

It is evident from the foregoing that this invention provides a simple unitary structure that may be attached to almost any domestic window fan of almost any make and which will thermostatically control that fan in a highly efficient way, indeed even better than thermostats sold mounted on electric fans.

Figures 1, 2, 4:
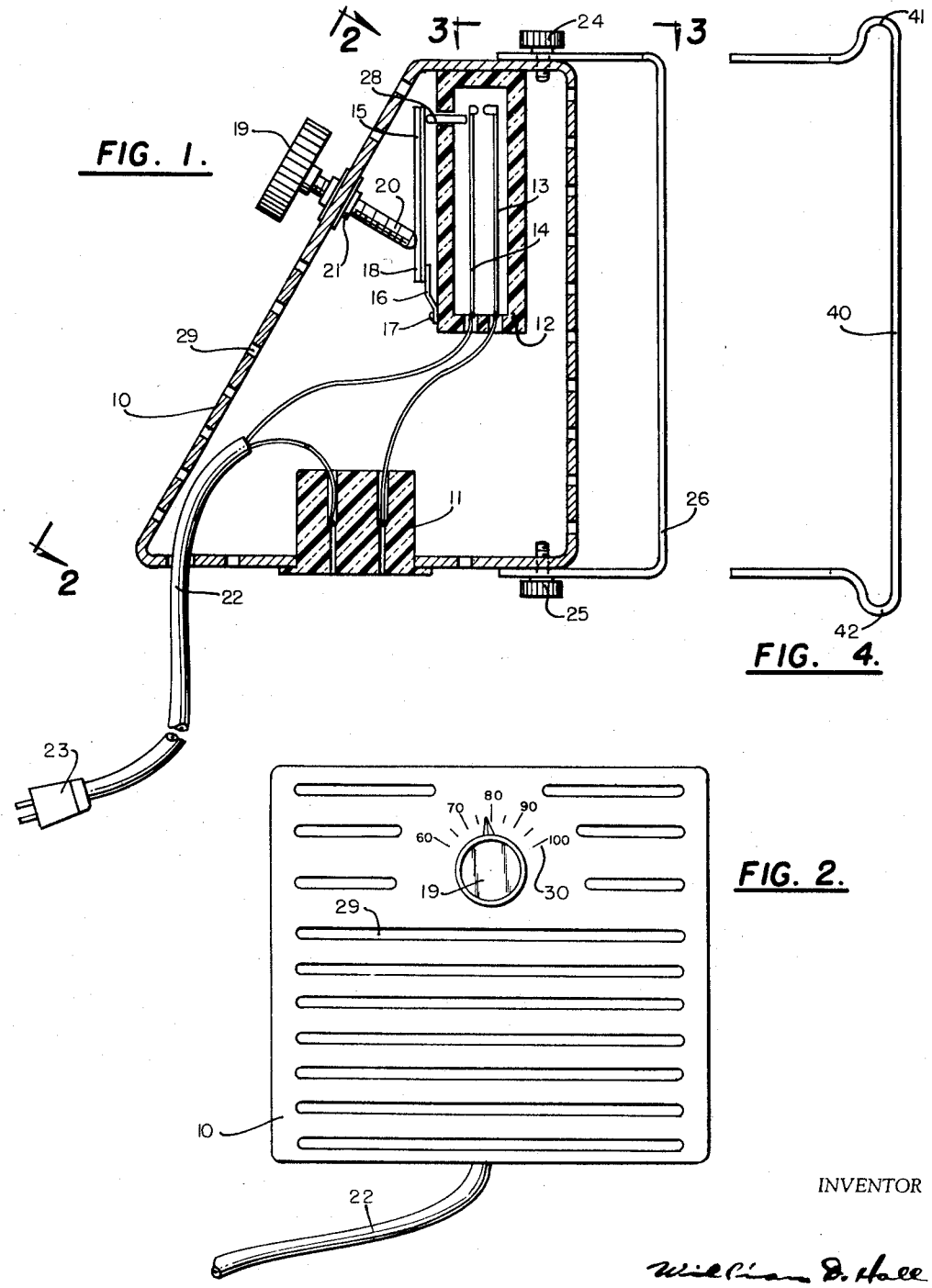
Figure 1 is a sectional view of the new control device.
Figure 2 is a front view of the new control device.
Figure 4 is a side view of an alternate form of clamping means.
Figure 3:
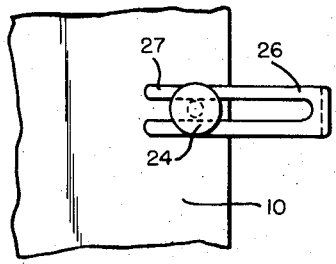
Figure 3 is a partial top view of the new control device.

In Figure 1, a casing 10 of metal or insulating material has a standard female electric socket 11 mounted thereon in any suitable location but preferably on the underside as shown. A second casing 12 of insulating material completely encloses switch blades 13 and 14. These blades are of course, at times, impressed with electric potential and it would be dangerous if it were possible for a child to project a metal object into contact with them. The casing 12 protects the contacts not only from dirt, etc., but also protects children from being shocked by projecting objects into contact with the switch blades. All the wires inside of casing 10 are of course insulated to provide additional protection. A temperature sensitive element, which in this case is a bimetal strip 15, is mounted on a piece of spring steel 16 which in turn is anchored at 17. The bimetal strip 15 and the spring steel strip 16 are fastened together at 18 in any suitable way. An adjusting knob 19 operates screw 20 which rotates in a support 21 that has internal threads that mate with the threads of screw 20, whereby when knob 19 is rotated to different temperature settings the screw 20 causes the spring steel strip 16 to move toward or away from the casing 12 and thereby control the position of the base end of the bimetal strip 15 and thereby vary the temperature at which the strip 15 will operate the switch 13, 14. An insulating rod 28 is moved to the right by the bimetal strip 15, and moves switch blade 14 into contact with blade 13 when the temperature rises. This starts the fan. When the temperature of strip 15 falls its upper end moves to the left and the resilient bias of switch blade 14 moves that blade along with rod 28 to the left to thus open the contacts. Any suitable means for making the opening and closing of the switch more abrupt may be added, for example a magnet may be placed on one of the switch blades in the manner well known to those skilled in the art.

The electric circuit of the device consists of a series circuit from one blade of female socket 11, through switch 13, 14, cord 22 and plug 23. If now the male plug at the end of the power cord of a conventional fan is plugged into socket 11 and if male plug 23 is plugged into the household lighting circuit, the new control device has been properly connected from the electrical standpoint.

The new control device is preferably mounted on the fan by clamping it thereto. Most fans include a guard to prevent the fingers and hands of a human being from coming into contact with the fan blades. The guard includes everything that contributes to this protective function and usually includes a grill, made up of a large number of parallel (or sometimes radial) rods called guard rods. The casing 10 is attached to the fan by looping the clamping means 26 over a plurality of guard rods and then sliding casing 10 into solid contact with the guard rods, whereupon the bolts 24 and 25 are tightened. As shown, the clamping means 26 has a portion thereof adapted to be hooked onto the grill of an electric fan.

Figure 5:
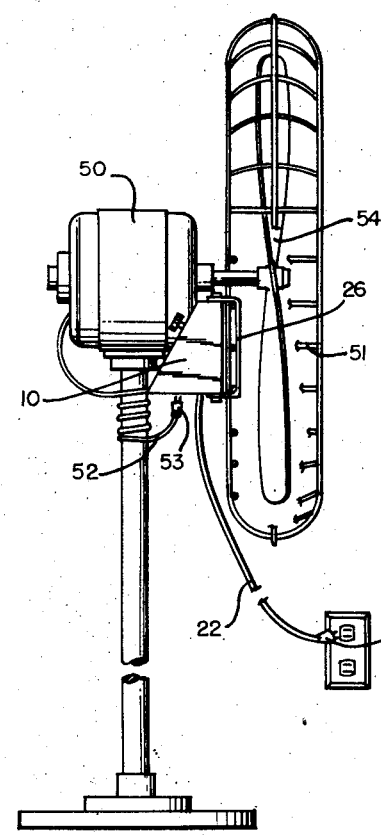
Figure 5 illustrates one way that the new control device may be mounted on one type of prior art electric fan.

Figure 5 illustrates a typical installation on a relatively small fan. The clamping means 26 extends around three of the guard rods 51 and the rear side of the casing 10 is pressing solidly against those guard rods. The fan 54 has a motor 50 and a power cord 52. The plug 53 at the free end of power cord 52 should be plugged into socket 11 and the plug 23 inserted into an electric outlet.

The apparatus is now ready for operation. The knob 19 is set for the desired temperature, as shown by scale 30. When the temperature of the air exhausted by the fan is below the setting, the switch 13, 14 is open and the motor 50 will not run, but when the temperature is above the preset value the switch is closed and the fan will run. The casing 10 is provided with numerous large vents 29 on several sides thereof, including the front and the rear. This allows large quantities of air to flow across the bimetal strip and thus insure that it reaches the temperature of the air as soon as possible.

Since the clamping means 26 of Figure 1 might not fit all fans, two alternate clamping devices are also supplied with the device. These include the modified clamping device 40 (Figure 4) which has indents 41 and 42. If the fan should have a grill the guard rods of which were spaced apart a distance exactly equal to the length of clamping means 26 of Figure 1, it would not fit and the device of Figure 4 would be used in its place. The clamping means 26 of Figure 1 is resilient and made of spring steel while that of Figure 4 is made of soft and easily deformable metal. This increases the number of fans to which the device may be connected.

Figure 6:
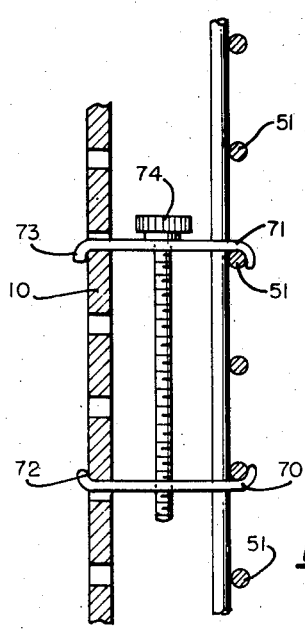
Figure 6 illustrates another clamping means for attaching the thermostatic control device to the grill of an electric fan.

A third form of clamping means is also supplied with the new control device since in some cases it is more convenient. It consists of two plates 70 and 71 (Figure 6) and the bolt 74. The plates 70 and 71 have lips at both ends. The lips 72 and 73 are placed into two vent slots of the rear side of casing 10, and the other two lips pass partially around two of the guide rods 51. The bolt 74 is threaded through both plates to hold them.

I claim to have invented:

1. A thermostatic control device adapted for attachment to the grill of a ventilating device comprising a temperature sensitive switching unit, an electrical socket, a plug, wires connecting the plug, switch and socket in series, a casing surrounding and supporting said switch, said casing having a front side and a rear side, a control knob on the front side of the casing and mechanically in engagement with said switching unit to effect adjustment thereof whereby to vary the temperature setting thereof, and clamping means carried by the casing for clamping said rear side of the casing against the grill of a ventilating device comprising a member extending away from said rear side and transverse thereto, said member having a hook portion that may be hooked over a part of a grill of a ventilating device and then moved inward toward the rear side of the casing to thereby clamp the rear side of the casing against the grill, said clamping means including adjustable means permitting the hook portion to be moved at will toward and away from the rear side of the casing so as to accommodate grills of different thickness, said adjustable means being operable to hold the hook portion in position after it has been moved to a position at which it clamps the casing against the grill.

2. A thermostatic control device as defined in claim 1 in which said rear side of said casing is substantially flat so that when it is clamped to a flat grill of a ventilating device the casing is held rigidly in place.

3. A thermostatic control device as defined in claim 2 in which said casing has holes therein through which air may pass.

4. A thermostatic control device as defined in claim 1 in which said socket is separate from the plug and is mounted on said casing.

References Cited in the file of this patent

UNITED STATES PATENTS

| | | |
|---|---|---|
| 1,925,822 | Shurtleff | Sept. 5, 1933 |
| 2,300,418 | Hall | Nov. 3, 1942 |
| 2,480,827 | Armstrong | Sept. 6, 1949 |
| 2,731,529 | Leins | Jan. 17, 1956 |
| 2,759,412 | Knapp | Aug. 21, 1956 |